Sept. 23, 1952     E. SCHULTZ, JR     2,611,173
MACHINE TOOL

Filed Dec. 11, 1947     4 Sheets-Sheet 1

INVENTOR.
Edward Schultz Jr.
BY
Dunning & Dunning
Attorneys

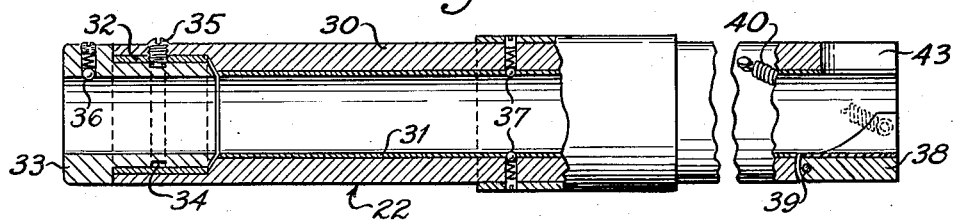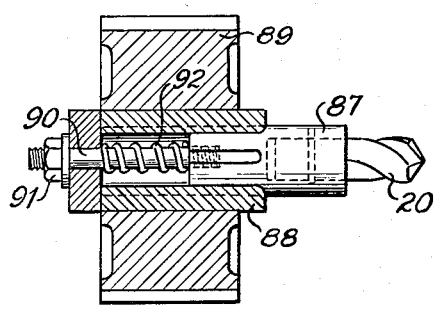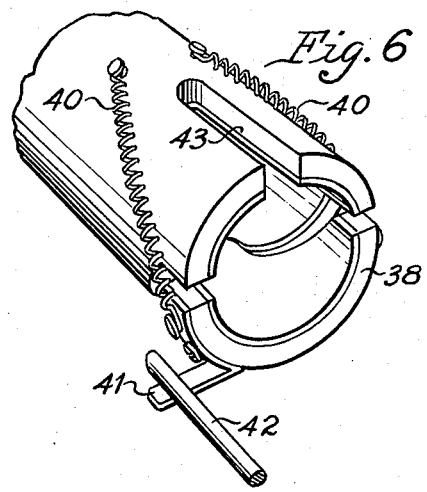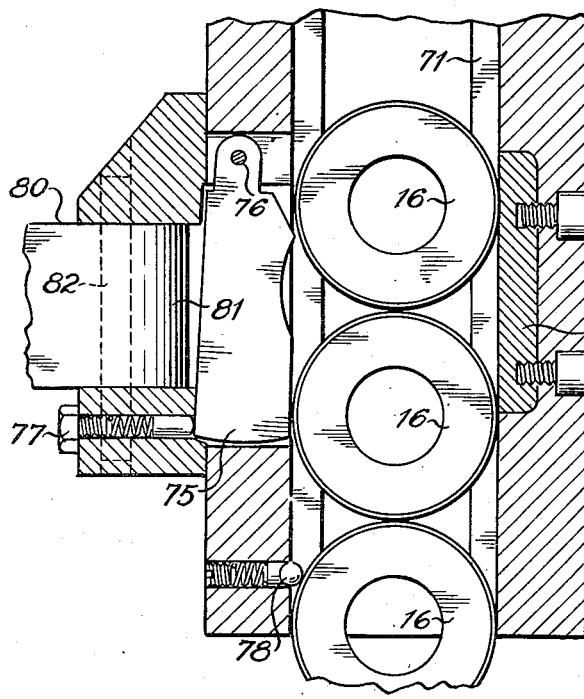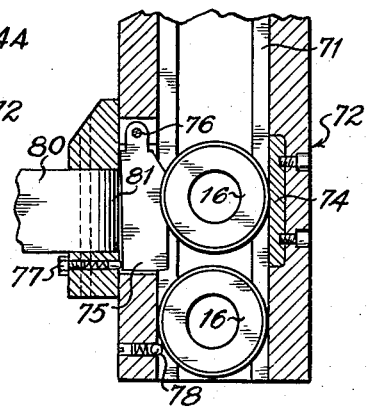

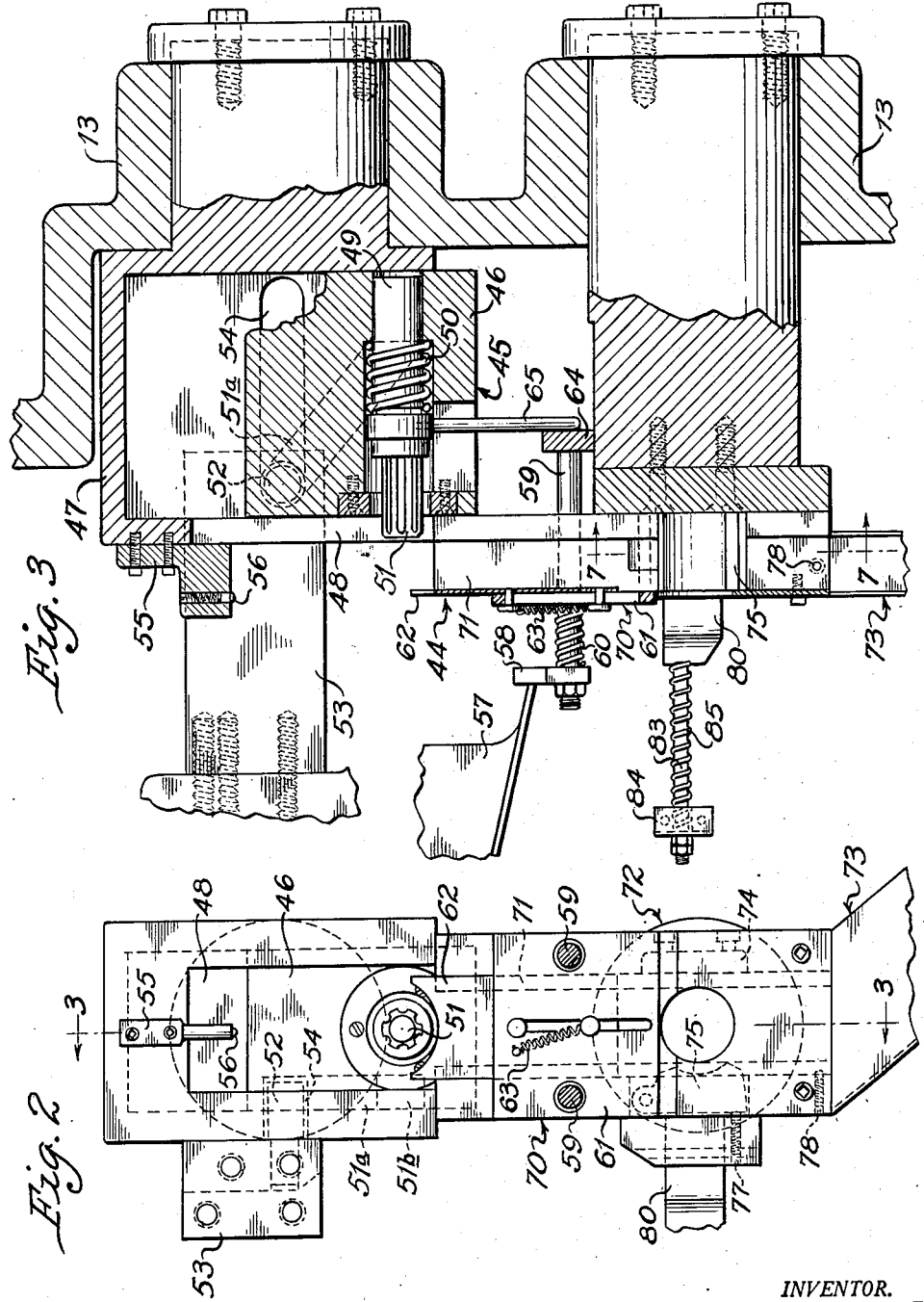

Sept. 23, 1952 — E. SCHULTZ, JR — 2,611,173
MACHINE TOOL
Filed Dec. 11, 1947 — 4 Sheets-Sheet 4
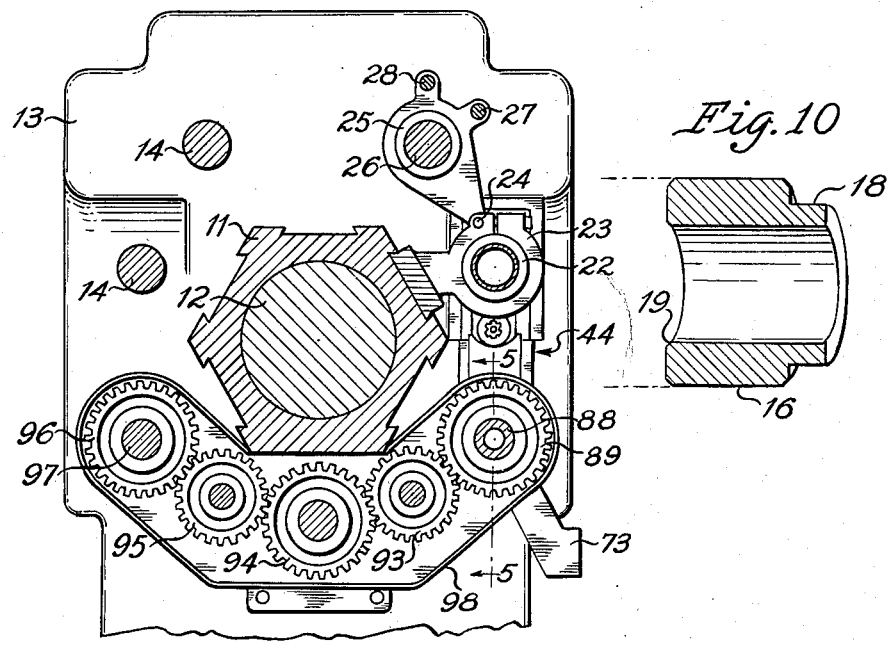
Fig. 9
Fig. 10
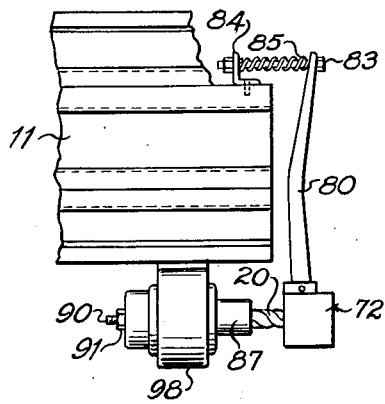
Fig. 12
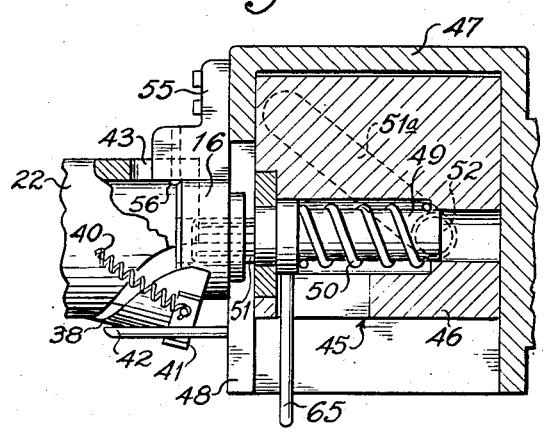
Fig. 11
INVENTOR.
Edward Schultz Jr.
BY
Banning & Banning
Attorneys Patented Sept. 23, 1952

2,611,173

UNITED STATES PATENT OFFICE 2,611,173

MACHINE TOOL

Edward Schultz, Jr., Chicago, Ill.

Application December 11, 1947, Serial No. 791,024

23 Claims. (Cl. 29—37)

This invention pertains to machine tools and has to do more especially with automatic screw machines and the like, being directed to improvements which enable the performance in a single machine, at a single set-up, of plural operations which, heretofore, have entailed either an extra spindle position of the screw machine, or transferring the unfinished piece-parts to a second machine, or re-running the piece parts through the first machine after re-setting the same to perform the additional or second-stage operations.

A conventional screw machine or automatic chucking machine can effect counterboring and similar operations only at the exposed end of the stock; but if the piece-part being produced calls for a counterboring or similar operation at the rear or cut-off end of the stock or rough part, as the case may be, it is usually necessary to perform such operation or operations in a separate machine as, for instance, a lathe or drill press, or else re-run the piece-parts after re-setting the first machine. In either event, a secondary operation of this nature introduces a substantial cost increase where the number of piece-parts to be produced is large.

One of my primary objects is to provide a machine tool for volume production which will perform, in a single set-up, machining operations on a piece-part in addition to the operations which can be performed in a single set-up by a conventional machine tool, thereby effecting substantial savings as a result of the elimination of time-consuming transferrence of the piece-parts for subsequent operations in the second machine.

A more specific object is to provide an improved screw machine or automatic chucking machine, as the case may be, wherein second-stage machining operations can be performed on surfaces which are not accessible during the initial set-up of the piece-parts, and which does not involve any manual re-setting of the piece-parts, thereby performing a greater number of operations on each piece-part in the same time that would otherwise be required to perform a lesser number of such operations.

A further object is to provide mechanisms which can be attached to conventional screw machines and similar machine tools and which will perform second-stage machining operations and will automatically transfer the piece-parts under production from an initial position in which first-stage machining operations are performed to a second position wherein second-stage operations are performed.

A still further object is to provide a means for processionally conveying the piece-parts under production from one position to another for second or third operations, as in a drill press, the conveying means embodying certain novel and improved features whereby to assure an accurate and secure positioning of each work piece when it is to be operated upon, and a dependable release and discharge from its operating position, all as will be hereinafter set forth in detail.

Additional objects will be made evident as the ensuing detailed description progresses.

My invention may be embodied either as a new machine in the entirety or as an addition or attachment designed for use on a conventional machine tool, and it is particularly adaptable to such tools as automatic screw machines and automatic chucking machines, which are tools of the volume production class; but it is not to be regarded as limited to any one species or narrow class of machine tools.

In the interest of clarity and convenience I shall refer herein to the operations ordinarily performed by a screw machine or the like as first-stage operations—which includes cutting off and such turning, boring, drilling, reaming operations, threading, etc. as can be performed prior to completion of the cutting-off operation, in the case of a screw machine, or prior to removal of the unfinished piece-part from a first-stage chuck where the invention is applied to an automatic chucking machine; and I shall refer to the operations performed by virtue of this invention as second-stage operations—which means operations performed after the piece-part has been severed from the bar stock, in the case of an automatic screw machine, or, in any event, after the piece-part has been removed from its initial position in the machine.

A preferred embodiment of the invention as applied to an automatic screw machine is illustrated in the accompanying drawings, and the several novel features thereof will be pointed out as the description proceeds.

In the drawings, of which there are four sheets:

Figure 2 is an elevational view, looking toward the front end of the transfer mechanism which serves to transfer the partially finished piece-parts from the discharge end of the take-off tube to the chuck in which they are held during the second-stage operation;

Fig. 3 is a sectional view of the transfer mechanism taken on line 3—3 of Fig. 2;

Fig. 4 is a view in elevation and partly in longitudinal section, of the take-off tube;

Fig. 5 is a detail in cross-section, taken on line 5—5 of Fig. 9, showing the second-stage operation tool which in this instance happens to be a twist drill;

Fig. 6 is a perspective view of the discharge end of the take-off tube;

Fig. 7 is an enlarged detail in section, taken at line 7—7 of Fig. 3 and illustrating how the piece-parts are fed through the transfer mechanism into and out of the second-stage chuck;

Fig. 8 is a view identical with Fig. 7, but on a smaller scale, showing a different stage in the progress of the piece-parts, one of which is centered in and clamped by the second-stage chuck;

Fig. 9 is a transverse sectional view taken approximately at line 9—9 of Fig. 1;

Fig. 10 is a detail, in cross-section, of a piece-part which the machine is set up to produce;

Fig. 11 is a detail of the piece-part transfer mechanism showing the conveyor in its uppermost position wherein the work mount receives a piece-part from the discharge end of the take-off tube; and Fig. 12 is a detail view illustrating the manner of actuating the second-stage chuck operating lever.

Figure 1:
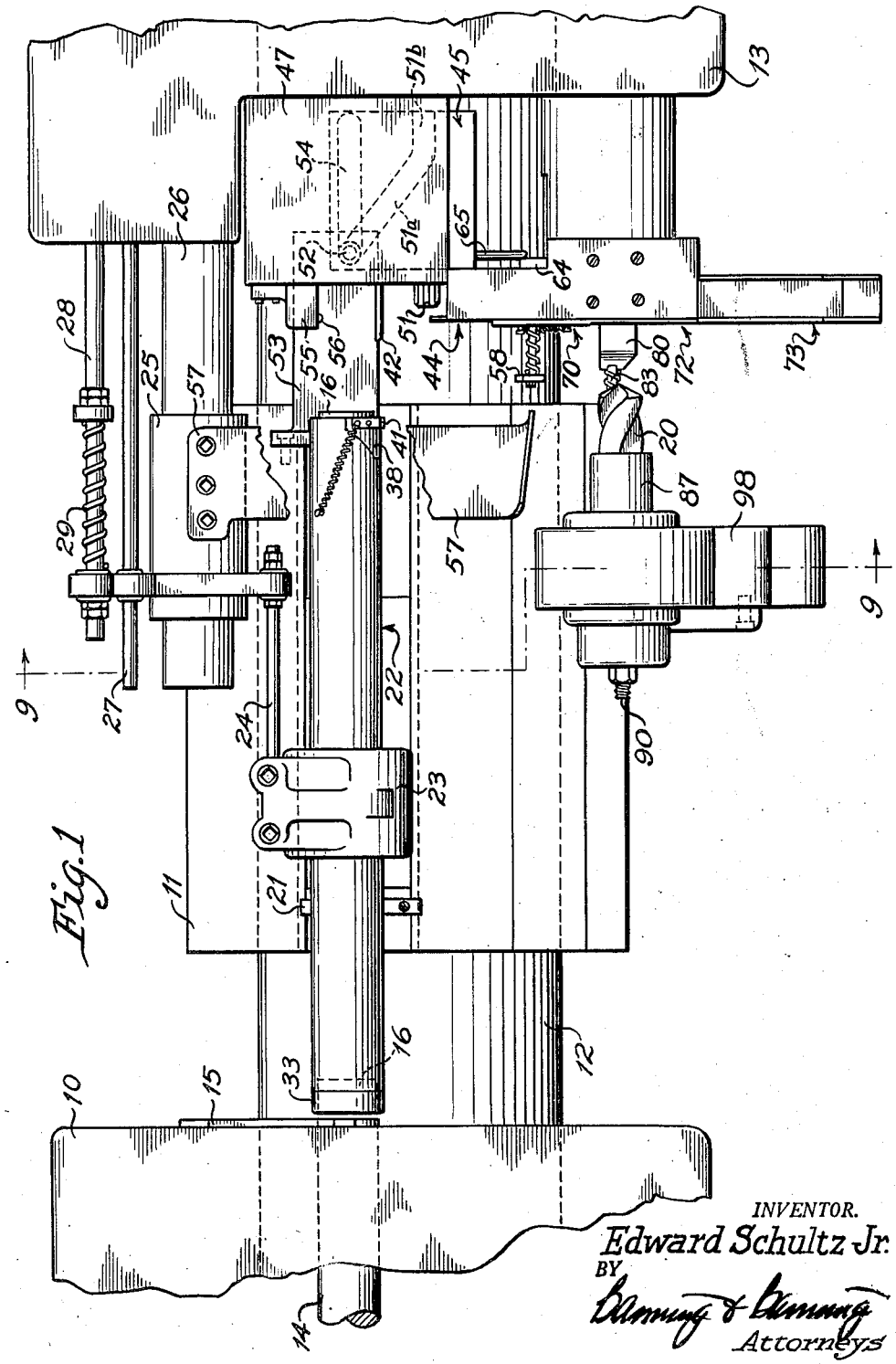
Figure 1 is a fragmentary side elevational view of an automatic screw machine of a conventional type which has been modified by the addition of equipment in conformity with the subject invention.

The machine to which the invention is shown applied is a New Britain-Gridley six-spindle automatic screw machine, which is well-known in the machine tool industry and needs no description here beyond indicating certain of the principal elements. These principal elements comprise a turret 10 having six spindles which revolve about a horizontal center of revolution, a main tool slide 11, a tool slide stem or guideway 12 on which the main tool slide is slidably mounted, and a housing 13 in which is contained the driving mechanism including various gears, cams, levers, etc. which serve to actuate and synchronize the movements of the turret and main tool slide and other parts—all of which are wholly familiar to screw machine personnel.

The main tool slide 11 is reciprocable along the tool slide stem or guideway 12 toward and away from the turret 10, and each of its six sides is adapted to support a tool, each of which tool is designed to perform a particular operation. A bar of round stock 14 is shown chucked in one of the spindles in Fig. 1, and it is to be understood that in this particular case the turret has six identical spindles equally spaced on a circle concentric with the axis of the turret, and that each spindle is loaded with a bar 14, only one of which is shown in the drawing. Cross-sections of two of the bars 14 are shown in Fig. 9, but the remaining four bars have been omitted in that view in order to avoid masking other parts of the disclosure which that view is intended to clarify. It will further be understood that the machine is equipped with suitable mechanism for feeding the bar stock forward the required distance just before each spindle reaches the first machining position, the feeding mechanism being a regular part of a conventional machine requiring no illustration or description.

In addition to the tools carried by the main tool slide, none of which are shown, there is provision in the machine for operating a cutting off tool 15 which is mounted on a suitable cross-slide, not shown; and there are also further provisions for supporting and operating dies and taps, but these do not need to be discussed further in this specification.

Before embarking upon a description of the novel mechanism constituting the subject matter of this invention, it will be well to take notice of the piece-part 16 shown in Fig. 10, which piece-part the described mechanism has been specially designed to handle. The piece-part here shown as a gear blank is cut from a round steel bar 14, such as is shown in Fig. 1 and indicated by dot-dash lines in Fig. 10, and is drilled and reamed axially, and reduced diametrically at 18, and also cut off from the bar, all during the first-stage operations. But when the piece-part is severed from the bar by the cutting-off tool 15, a burr is left at 19 which must be removed; and this would ordinarily involve an additional operation in a separate machine. The present invention avoids the necessity of transferring and setting up such partially finished piece-parts in a separate machine for removal of the burr at 19.

In the case here chosen for illustration, the second-stage operation, consisting only of the removal of a burr, is an exceedingly simple one; and it is desirable to bring out and emphasize at this point that the improvement to be described is not merely a de-burring mechanism, but it is adapted for the performance of any limited machining operation at the cut-off end of the piece-part which cannot be performed during the first-stage operation. By way of example, it might be required to cut an annular groove in the left-hand face of the piece-part which, obviously, could not be accomplished during the first-stage operation and would, in the absence of the present invention, require setting up the piece-part in a lathe or drill press after completion of the screw machine operation.

For removing the burr at 19, a twist drill 20 is provided, together with suitable centering and driving means, to be described; and means, also to be described, are provided for transferring the piece-parts upon completion of the first-stage operations to a chuck in which they are held and centered in alignment with the drill. Such a drill may, of course, be replaced by whatever tool may be needed to perform any particular second-stage operation.

The bar 14 shown in the drawing is in the final or cutting-off position, as is the turret spindle in which it is chucked, and the cutting-off tool 15 is shown advanced sufficiently to sever the piece-part from the bar. The latter is shown in Fig. 1, partially disposed within the left-hand end of a tube 22 which is referred to herein as a take-off tube. The latter is detailed in Figs. 4 and 6. As shown, the tube 22 is mounted in and carried by a supporting member 23 which is slidably mounted on one face of the main tool slide 11. This tube is reciprocable lengthwise with the supporting member 23, which latter is connected by means of a tie-rod 24 to a sleeve 25 slidably mounted on a bar 26 (which may be an auxiliary tool slide). The sleeve 25 is engaged by a guide bar 27 and actuated for reciprocable movement by a pusher rod 28. A safety spring 29 between the pusher rod 28 and the sleeve 25 permits a limited amount of lengthwise movement of the pusher rod toward the turret after the take-off tube has reached the limit of its permissible movement in the same direction. A stop 21 secured to the main tool slide limits the movement of the take-off tube so that it will not contact the cutting-off tool 15. The manner of mounting and supporting the take-off tube is not important so long as the arrangement provided is such that said tube is reciprocated lengthwise in properly timed relation to the movements of other parts of the machine which cooperate therewith, as presently will be elucidated.

The take-off tube 22 comprises a tubular steel body member 30 (see Fig. 4) having optionally a lining 31 of brass or the like and a bushing 32 at its left-hand end in which is journaled a freely rotatable head 33. The latter has an annular groove 34 which is engaged by a stop screw 35 serving to retain the rotatable head in place while permitting rotation thereof. The bore of the rotatable head is approximately the same as that of the lining 31 and is just large enough to receive freely the piece-parts 16 which pass through the tube bore in an unbroken train.

The rotatable head may turn with the piece-part being cut off, thus reducing or avoiding abrasive contact, and it is provided with one or more latches or detents such as spring-pressed balls 36 which bear against the piece-parts as they pass therethrough and hold them in place so that they cannot drop out when the take-off tube moves to the right. Another series of latches or detents, such as spring-pressed balls 37, serves to keep the piece-parts from backing up when pressure is applied to the piece-parts at the right-hand end of the train. The detents 37 preferably are so located that they will engage the outside bevel at the left-hand end of the piece-part, as shown in Fig. 10, thus providing a fairly solid backstop for the series of piece-parts to the right of the detents 37. At its right-hand end the take-off tube is provided with a jaw 38 pivoted at 39 and normally held closed by a pair of tension springs 40. This jaw which serves to hold each piece-part in correct position for transfer to a mount (presently to be described) is supported for downward swinging movement. It is equipped with a laterally extending arm 41 adapted to be engaged by a finger 42 (see Fig. 6) by means of which the jaw is opened at the proper time to release the piece-part at the extreme right-hand end of the tube. A lengthwise extending slot 43 is cut in the right-hand end of the take-off tube for a purpose which presently will be clarified.

Concurrently with or immediately preceding the cutting-off operation effected by the cut-off tool 15, the take-off tube is moved bodily to the left, as viewed in Fig. 1, and the piece-part 16, which still is unsevered from the bar 14, enters the bore of the revolving head 33; and if there are other piece-parts already in the take-off tube these will be pushed to the right through the tube bore by an amount equal to the length of one piece-part. When a sufficient number of piece-parts have been cut off the entire bore of the take-off tube becomes filled therewith, and the piece-part at the extreme right-hand end of the tube is held in place by the jaw 38, ready to be removed for transferral downwardly (or, at any rate, in a lateral direction) to the chuck which serves to hold it in alignment with the drill 20 while the de-burring or second-stage operation is being performed.

Immediately following completion of each cutting-off operation by the tool 15, the take-off tube is moved lengthwise to the right, this movement being controlled and timed by suitably designed cams forming integral parts of the screw machine proper. It is considered unnecessary to illustrate the cams and intervening mechanism because they constitute regular working parts of all screw machines, and anyone who is versed in the operation and setting-up of automatic screw machines will know how to lay out the cams to bring about properly timed movements of the take-off tube. For the same reason it is unnecessary to illustrate the cams and other mechanism which serve to drive and control the movements of the main tool slide 11 and cause such movements to take place at the right time and to the required degree. It will be advantageous, however, to provide for movement of the tool slide toward and from the work at a relatively high speed except when near the work at the end portion of its stroke where a normal rate of feed should be maintained.

A transfer mechanism, identified as a whole by the reference numeral 44, functions to transfer the piece-parts emerging from the right-hand end of the take-off tube 22 to a position in alignment with the tool or drill 20 wherein the aforementioned de-burring operation is performed.

The transfer mechanism includes a conveyor 45 comprising a slide 46, which is a rectangular block mounted for vertical reciprocation in a housing 47 having a vertical slot 48 in its front face. A plunger 49 also forms a part of the conveyor and is carried by the slide 46. This plunger is movable axially and is biased to the left (as viewed in Figs. 3 and 11) by a coil spring 50. The left-hand end portion 51 of the plunger extends through the slot 48 and constitutes an arbor of a diameter to slidably fit the bore of the piece-part; it will be referred to as the work mount because the work or piece-part is mounted thereon during a part of the transferral operation. Manifestly, if the piece-part has no bore by means of which it can be mounted on an arbor, it will be necessary to use a socket type of work mount.

The slide 46 is provided at one side with a diagonal slot 51a which is engaged by a driving pin or gudgeon 52 carried by an arm 53 which is connected to and movable with the main tool slide the movements of which are timed to raise the conveyor 45 simultaneously with each right-hand movement of the take-off tube. The pin 52 rides in and is guided by a horizontal slot 54 formed in one side of the housing 47, and it functions by virtue of its engagement with the diagonal slot 51a to alternately raise and lower the slide 46 as it moves horizontally from end to end of the slot 54. Hence, as the take-off tube moves to the right, the work mount 51 is raised to a position in axial alignment with the bore of the piece-part at the discharge end of said tube. The pin 52 also serves as a shear connection which will break in case of jamming of the mechanism, thereby to protect the operating units thereof. The lower end of the diagonal slot 51a terminates in a horizontal extension slot 51b (see Fig. 1) which allows the pin 52 to continue its movement after first bringing the work mount into alignment with the piece-part. Further movement of the take-off tube then results in placing the piece-part onto the work mount. This is clearly illustrated in Fig. 11 where it is also shown how the jaw 38 is opened and held open by the finger 42 which latter is secured at one end to the housing 47.

A bracket 55 attached to the housing 47 is positioned to enter the slot 43 in the take-off tube. This bracket carries a latch or detent such as a spring-pressed pin 56 which is positioned to engage the rear peripheral edge of the piece-part so as to ensure against the possibility of the piece-part being pulled off the work mount when the take-off tube moves to the left. The opening of the jaw 38 also effects disengagement of the piece-part so that there is no likelihood of the piece-part being withdrawn from the work mount when the take-off tube recedes.

As soon as a piece-part has been centered on the work mount and the turret has advanced to bring another spindle into cut-off position, the take-off tube moves to the left to resume the position in which it is depicted in Fig. 1; and at the same time or immediately thereafter the conveyor 45, which includes the slide 46 and plunger 49, moves downwardly by virtue of the reverse movement of the pin 52.

Bolted to the sleeve 25 is an arm 57 which moves in a predetermined timed relationship with the take-off tube and is effective during each right-hand movement of said tube to press against a cross-bar 58 which is attached to and bridged across two parallel push rods 59 and thus to move said push rods to the right, as viewed in Fig. 3, against the resistance of a pair of restoring springs 60 which exert a reactive thrust against a retaining plate 61 constituting one wall of the chute. This retaining plate is carried by the rods (or otherwise) so as to have capacity for outward movement against the tension of the springs 60 in the event that an over-long piece-part is received in the chute. The inner face of the retaining plate is recessed to provide a vertical way for slidingly receiving a guide tongue 62 normally sustained in an up position by a spring 63 which is connected thereto and to the retaining plate 61. The arcuate top edge of this tongue normally stands close to the top of the retaining plate 61, and may yield downwardly in response to pressure from a work-piece if improperly positioned on the mount 51, thereby to avoid damage to the transfer mechanism. An additional cross-bar 64 bridges across and connects to the right-hand ends of the push rods 59 to engage and press laterally against an arm 65, the upper end of which is rigidly attached to the plunger 49. As the take-off tube starts each excursion to the right, the plunger 49 is moved to the right by the arm 65 against the pressure of the spring 50, and by some such means as this I provide for retraction of the work mount 51 to an extent sufficient to disengage the piece-part therefrom.

Immediately following the above-described retraction of the work mount and while the take-off tube is still moving to the right, the main tool slide quickly moves in the same direction, causing the conveyor to rise, as previously described. As soon as the arm 65 has risen sufficiently to clear the cross-bar 64, it is released therefrom and the plunger 49 moves outwardly under the impetus of the spring 50. The movements of the tool slide and the take-off tube are, of course, so timed that the described functions are properly coordinated; and this is done by appropriately correlating the cam layouts, as will be well understood by persons skilled in the art.

The transfer mechanism also includes a chute 70 having a passageway or conduit 71, the upper or receiving end of which is situated just below the down position of the work mount 51, as shown in Fig. 3. This passageway or conduit 71 which extends downwardly is designed to allow a single-file of piece-parts 16 to pass through the chute to a chuck 72, which is incorporated in the chute, and thence downwardly to a discharge chute 73 from which the finished piece-parts pass, usually to a tote box or collecting receptacle.

The chuck 72 comprises a fixed jaw 74 (see Figs. 7 and 8) and movable jaw 75 which at one end is pivoted at 76 so that its opposite end can swing toward and away from the piece-parts in the conduit 71. A spring-pressed pin 77 bears against the rear face of the jaw 75, biasing the same lightly toward the piece-parts. A detent in the form of a spring-pressed ball 78 engages the lowermost piece-part with sufficient force to prevent the entire train thereof from moving down merely under its own weight. The train of piece-parts may be forced downwardly, however, by pressure from the mount 51 whenever it starts to descend.

In Fig. 7, three piece-parts 16 are shown in the course of a downward movement of the train, one piece-part being shown leaving the chuck and another entering. In Fig. 8 a piece-part is shown centered in the chuck in which position it is aligned with the drill 20 and, the chuck being closed, in readiness for the de-burring operation. The train of piece-parts is not moved downwardly through the chute 70 solely by gravity, but in part by the work mount 51 as it approaches its downmost position. The piece-part carried by the work mount bears against and presses downwardly on the top piece-part in the chute, causing the train of piece-parts in the chute to drop sufficiently to release the lowermost one of them from the detent 78, whereupon the train thereabove is free to drop by gravity the slight distance necessary to position the next piece-part within the chuck.

The chuck jaw 75 is actuated by some such means as a lever 80 (see especially Fig. 12) having at the chuck end a cam or eccentric portion 81 which is positioned to bear against the back of the jaw and is fulcrumed on a pin 82. The distal end of the lever 80 is connected through the medium of an adjustable bolt 83 and bracket 84 to the main tool slide 11, and a cushion spring 85 is interposed between the bracket 84 and the end of the lever 80. The cushion spring 85 will compensate for variations in diameter, etc. of the piece-parts and will also yield to protect the associated parts from damage in case a piece-part be not properly positioned in the chuck. During each movement to the right of the main tool slide 11, the lever 80 is caused to rotate, either directly or indirectly, in the direction which is effective to cause the cam or eccentric 81 to bear against the movable jaw 75, and this movement is timed to take place immediately after a piece-part has been centered in the chuck, as shown in Fig. 8. The return movement of the tool slide causes the lever 80 to be rotated in the opposite direction and thus releases the grip of the chuck on the piece-part which, of course, occurs after the de-burring operation has been performed by the boring bar or other tool 20.

The tool 20 is mounted in a socket 87 which is splined externally and slidably mounted in the complementally splined bore of a sleeve 88 which is keyed to a gear 89 through which it extends axially and by which it is rotated to drive the tool. The socket 87 is anchored by a stud 90 one end of which is secured to the socket while the other end is threaded to receive a nut 91. The lengthwise position of the socket 87 and, therefore, of the tool 20 can be adjusted by turning the nut 91. A spring 92 encircling the stud 90 presses outwardly on the socket 87 and thus serves to hold the tool against the work somewhat yieldably but with sufficient pressure to enable the tool to cut; it also provides a factor of safety in case the piece-part be misaligned with respect to the tool.

The gear 89 is the final one of a train of five gears, which includes, in addition, gears 93—96 inclusive, shown in Fig. 9, the latter of which is connected to a power shaft 97 forming a part of the screw machine. The entire gear train, together with the sleeve 88 and socket 87, is mounted in a housing 98, see Fig. 1, which housing is attached to and movable with the main tool slide 11; in consequence, the tool 20 moves axially with the main tool slide, and its movements are co-ordinated with the opening and closing of the chuck so that the drill is in working position only when the chuck is closed or when the tool slide is in withdrawn position.

The transfer mechanism comprises a chute through which a plurality of work pieces in succession are gravity fed to a position within the chuck where they are locked while being operated upon. This chute is, in effect, a magazine wherein is maintained a supply of work pieces each awaiting, in turn, the performance of an operation which takes place in timed relation to (1) transfer into the chute of a new work piece and (2) discharge from the chute of a work piece freshly operated upon. The means which releases each new work piece into the chute, i. e. the work mount 51, also operates through the train of work pieces in the chute to force a release therefrom of the work-piece which is foremost in the train. The controlled release, i. e. the detent 78, also restrains in a predetermined position the foremost work piece which in turn supports the adjacent work piece thereabove in the correct position to be locked by the chuck while subjected to the intended operation. Such a transfer mechanism may be employed to advantage in various places and with machines of different types for feeding work pieces successively to chuck position where an operation is to be performed.

While I have shown and described only a single embodiment of my invention, it is to be understood that the invention is susceptible of many modifications and is adaptable to a variety of widely differing machine tools. Accordingly, it is not my intention that the invention be regarded as limited, except as indicated by the terms of the appended claims.

I claim:

1. Mechanism for transferring piece-parts from a first-stage machining position to a second-stage machining position, comprising a reciprocable slide, a work mount carried by said slide and movable therewith between a work-receiving position and a work-discharge position, said work mount being reciprocable in a path perpendicular to that of the slide and movable outwardly with respect to the slide to engage a piece-part at said receiving position and carry the same to said discharge position and further movable inwardly into the slide to disengage the piece-part at said discharge position.

2. Transfer mechanism for conveying partially finished piece-parts from the axial center of a screw machine spindle to a chuck situated laterally of the spindle axis extended, said transfer mechanism including a chute having a passageway through which the piece-parts are movable in a continuous train, and a conveyor for feeding the piece-parts to the receiving end of said chute, said conveyor including a work mount which is movable between a first position wherein it is aligned with said spindle and a second position adjacent the receiving end of the chute, said work mount being operative to receive piece-parts, one at a time, at said first position and to disengage said piece-parts at said second position, said work mount being operatively connected with a moving part of the screw machine whereby it is moved cyclically between said first and second positions, and means connected with a moving part of the screw machine for actuating said work mount to disengage the piece-part therefrom at said second position, said conveyor being operative during each movement of said work mount toward said second position to advance the piece-parts in said chute a sufficient distance to feed a partially finished piece-part into said chuck and discharge a finished piece-part therefrom.

3. Transfer mechanism for conveying partially finished piece-parts from a point in line with the axial center of a screw machine spindle to a chuck situated laterally of the spindle axis extended, said transfer mechanism including a chute having a passageway through which the piece-parts are movable in a continuous train, and a conveyor for feeding the piece-parts to the receiving end of said chute, said conveyor including a slide connected with a moving part of the screw machine and movable thereby cyclically between a first position and a second position, a plunger carried by said slide and movable lengthwise pependicularly to the path of the slide, a spring biasing said plunger lengthwise toward an outwardly extended position, a work mount at one end of said plunger adapted to receive piece-parts, one at a time, when the slide is in said first position and operative to disengage the piece-part thereon when the plunger is retracted against said spring, and means connected with a moving part of the screw machine for retracting said plunger when said slide is in said second position.

4. In combination, a multiple-spindle screw machine having a main tool slide reciprocable axially of the machine turret and in timed relation with the succesive rotary movements of the turret, transfer mechanism for conveying partially finished piece-parts from the axial center of a screw machine spindle to a chuck situated laterally of the spindle axis extended, said transfer mechanism including a chute having a passageway through which the piece-parts are movable in a continuous train, a chuck located at said chute in laterally displaced relation to the final spindle position of the screw machine, means for opening and closing said chuck, said means being connected to said main tool slide for operation thereby to clamp the chuck during each recessive movement of the tool slide and to release the chuck during each forward movement of the tool slide, and a tool aligned with said chuck and operative to perform an operation on each piece-part as it is held in said chuck, said tool being connected to and movable by said tool slide toward and away from said chuck.

5. In combination, a multiple-spindle screw machine having a main tool slide reciprocable axially of the machine turret and in timed relation with the successive rotary movements of the turret, and having, in addition, a reciprocatory push rod which also moves in timed relation with the successive rotary movements of the turret, an elongated take-off tube having a lengthwise bore aligned with the turret spindle, said tube being connected with said push rod and reciprocable lengthwise thereby toward and away from the turret, said tube being operative to convey a continuous train of piece-parts from the turret, a chuck located in laterally displaced relation to the turret spindle, means for transferring the piece-parts from the take-off tube to the chuck at the cut-off position, and a lever for opening and closing said chuck, said lever being connected to said main tool slide and operable thereby to clamp the chuck during each recessive movement of the tool slide and to release the chuck during each forward movement of the tool slide.

6. In combination, a chuck having an axis about which a piece-part can be centered within the chuck, a guide extending above and below the chuck perpendicular thereto and defining a passage through which piece-parts pass by gravity, said chuck comprising a fixed jaw at one side of said axis and a movable jaw at the other side of said axis, spring means urging said movable jaw toward said fixed jaw, and a cam operative to positively move said movable jaw whereby to firmly clamp a piece-part in the chuck.

7. In combination, a chuck having an axis about which a piece-part can be centered within the chuck, said chuck comprising a fixed jaw at one side of said axis and a movable jaw at the other side of said axis, a guide extending vertically above and below the chuck perpendicular to the axis thereof and between the jaws and through which piece-parts move downwardly by gravity, said movable jaw being pivoted at one end so that its free end is movable in a path perpendicular to said axis and transversely of the chuck into position to clamp and release a piece-part in the chuck, spring means urging the free end of said movable jaw toward said fixed jaw, and a lever-operated cam operative to positively move said movable jaw into clamping engagement with a piece-part disposed in the chuck between the jaws.

8. In combination, a fixed chute, a chuck having an axis about which a piece-part can be centered within the chuck, said chuck comprising a fixed jaw at one side of said axis and a movable jaw at the other side of said axis, said jaws being located at opposite walls of the chute and adapted when open to receive a piece-part between them, means urging said movable jaw toward said fixed jaw, means operative to positively move said movable jaw whereby to firmly clamp a piece-part in the chuck.

9. Mechanism applicable to a machine tool for transferring piece-parts from a first-stage position comprising a straight longitudinal take-off tube having a receiving end and a discharge end and reciprocable lengthwise toward and away from the piece-part at the first-stage position, said tube being provided at the receiving end with means for gripping and removing the piece-parts and having a bore through which the piece-parts pass in a continuous train effected by reciprocation of the take-off tube, and a movable jaw mounted on the take-off tube at the discharge end thereof and arranged to engage piece-parts for holding the same against movement and operable to release piece-parts one at a time.

10. Mechanism applicable to a machine tool for transferring piece-parts from one stage position to another comprising a take-off tube forming a conduit for the piece-parts and reciprocable lengthwise to effect feeding of the piece-parts in a continuous train from one end of the tube to the other and for discharging the piece-parts, one at a time, from one end of said take-off tube, and transfer means including a slide reciprocable cyclically along a path perpendicular to the axis of said tube and in timed relation with the reciprocatory movement of the tube, and a work mount carried by said slide and reciprocable in a path parallel to the axis of said tube, the reciprocatory movements of said work mount being coordinated with the movements of said tube.

11. Mechanism for transferring piece-parts to a position for the performance of a machining operation, comprising a conduit through which the piece-parts are conducted consecutively to said position, and a conveyor operative to receive the piece-parts, one at a time, and positively convey the same to the receiving end of said conduit, said conveyor comprising a reciprocable slide, a plunger carried by the slide and movable therewith between a receiving position and a discharge position adjacent the receiving end of the conduit, said plunger being reciprocable lengthwise perpendicularly to the path of said slide and having a work mount at one end adapted to receive piece-parts, one at a time, at said receiving position for conveyance to said discharge position, means for reciprocating said slide, and means coordinated with the movements of said slide for moving said plunger lengthwise at said discharge position to effect disengagement of the piece-parts from said work mount.

12. Mechanism for transferring piece-parts to a position for the performance of a machining operation, comprising an elongated take-off tube reciprocable lengthwise and having a longitudinal bore through which the piece-parts are movable in a continuous train from a receiving end of said take-off tube to a discharge end thereof effected by reciprocation of said tube, and a chute having one end located adjacent the discharge end of said tube and arranged to receive piece-parts, one at a time, a reciprocable slide provided with means for transferring piece parts from the take-off tube to the chute, and a movable chuck jaw arranged to engage said piece-parts, one at a time, during the movement of the same through the chute, said slide being operative to move the piece-parts, one at a time, through said conveyor.

13. A screw machine of the class described, including a chute, a reciprocable slide for transferring piece-parts, one at a time, to the chute, a plunger carried by the slide and movable lengthwise perpendicularly to the path of said slide, said plunger having a work mount at one end arranged to receive and hold piece-parts, said slide being movable to carry said piece-parts to said chute and the path of the work mount during such movement of the slide being parallel to that of said slide, and means for retracting said plunger and work mount each time the latter reaches said chute, whereby to disengage the piece-part from the work mount and deposit the piece-part in the chute.

14. A screw machine of the class described including a chute adapted to receive piece-parts, a slide for conveying partially finished piece-parts, one at a time, to the receiving end of the chute, a plunger carried by the slide and movable lengthwise perpendicularly to the path of said slide, said plunger having a work mount at one end which is operative to receive and hold piece-parts, one at a time, and movable with the slide to carry the piece-parts to the receiving end of the chute, the path of the work mount to said chute being parallel to that of the slide, means operative by said machine for retracting the plunger and the work mount each time the latter reaches the receiving end of the chute, whereby to disengage the piece-part from the work mount and deposit the piece-part in the chute, a chuck jaw mounted at said chute and movable to grip and release the piece-parts, one at a time, while the same are passing through the chute, and means interconnecting said jaw with a moving part of the machine for opening and closing said jaw at properly timed intervals.

15. A screw machine of the class described, including a take-off tube having a lengthwise bore and provided with a revolving head at one end arranged to receive piece-parts, said head having a bore of the same diameter as that of the tube and adapted to telescope over piece-parts so as to receive and support said piece-parts, means connected with a moving part of the machine for reciprocating said tube lengthwise, latches arranged interiorly of the take-off tube and engaging piece-parts for holding the same against displacement during reciprocation of the take-off tube, and transfer means operable by said screw machine for transferring piece-parts from the end of said tube remote from said revolving head.

16. A screw machine of the class described, including a take-off tube having a lengthwise bore and provided with a receiving end enlarged internally and forming a socket in the receiving end of the tube, a tubular part-receiving head having a portion rotatably mounted in the socket through the outer end thereof and formed with an external groove about its circumference, a retainer screw carried by said tube and engaged in said groove and serving to prevent sliding of the head longitudinally in the socket, said head forming a continuation of the tube, its bore being of a diameter suited to telescopically embrace piece-parts, means connecting said tube with a moving part of the machine for reciprocating said tube lengthwise cyclically for gripping piece-parts and feeding piece-parts one at a time, into the tube and for conveying said piece-parts through the tube, and latches arranged interiorly of the take-off tube and engaging piece-parts for holding the same against accidental displacement during reciprocation of the take-off tube.

17. In a screw machine of the class described, the combination of a take-off tube provided with a revolving head at one end and adapted to receive piece-parts at the said end and discharge the same at the other end, means operable by a moving part of the machine for reciprocating the take-off tube longitudinally for effecting movement of the piece-parts through the take-off tube, a chute spaced from the discharge end of the tube and extending in a direction transversely of said tube, a chuck in said chute, transfer means operable by a portion of the screw machine in timed relation to movements of said tube and having movements transversely of the tube toward and away from the chute and adapted to pick off piece-parts, one at a time, from the discharge end of the take-off tube and to convey the same to the chute along a path perpendicular to the axis of the take-off tube, and latches arranged interiorly of the take-off tube and engaging piece-parts for holding the same against accidental displacement during reciprocation of the take-off tube.

18. A screw machine of the class described, including means defining a conduit through which piece-parts can be fed processionally, a detent restraining the foremost piece-part at a predetermined point in the conduit whereby to arrest movement of a succeeding piece-part, and means for periodically advancing for a limited distance the piece-parts within the conduit whereby to discharge therefrom the piece-part which is foremost therein.

19. A screw machine of the class described, including means defining a conduit through which piece-parts can be fed processionally, said conduit comprising a retaining plate and yielding means for holding the retaining plate in operative position relative to the conduit, but permitting movement outwardly therefrom in response to an excess of pressure exerted endwise by a piece-part moving therewithin, and means for positively advancing piece-parts processionally and intermittently through the conduit.

20. A screw machine of the class described including means defining a conduit through which piece-parts can be fed processionally, the conduit comprising a retaining plate, yielding means for holding the retaining plate in operative position relative to the conduit but permitting movement outwardly therefrom in response to an excess of pressure exerted endwise by a piece-part moving therewithin, and yielding guide means at the entrance of the conduit carried by the retaining plate and movable independently thereof in response to pressure exerted thereupon in the direction of feeding movement of the piece-parts through the conduit, and means for positively advancing piece-parts processionally and intermittently through the conduit.

21. A screw machine of the class described, includng means defining a conduit through which piece-parts can be fed processionally, the conduit comprising a retaining plate and yielding guide means at the entrance to the conduit carried by the retaining plate and movable independently thereof in response to pressure exerted thereupon in the direction of feeding movement of piece-parts through the conduit, and means for positively advancing piece-parts processionally and intermittently through the conduit.

22. Mechanism applicable to a machine tool for transferring piece-parts from a first-stage position comprising a horizontal take-off tube reciprocable lengthwise toward and away from a piece-part at said first-stage position, said tube having a socket at one end, a sleeve rotatable in said socket and adapted to receive parts from the first stage position, one at a time, the said tube being open at both ends and forming a conduit therein which a train of identical piece-parts is movable away from the first-stage position to the remote end of the take-off tube by reciprocation thereof, and detents located interiorly of the sleeve and the takeoff tube and arranged to engage the piece-parts at the end portions of the take-off tube and prevent accidental movement of the piece-parts out of the tube.

23. The combination with a machine tool having a spindle adapted to mount a piece-part, of a take-off tube disposed in axial alignment with said spindle, said take-off tube being open at both ends and having one end situated adjacent the end of the spindle on which the piece-part is mounted provided with a socket, a sleeve rotatably mounted in said socket and having a part-receiving bore corresponding in diameter to the bore of the tube, said tube being reciprocable to remove piece-parts from said spindle and cause the same to move through the take-off tube from the receiving end thereof to the other end thereof, latches located in said sleeve and within the tube intermediate the length thereof and arranged to engage piece-parts for holding the same against accidental displacement, and jaws at the discharge end of the tube for gripping piece-parts.

EDWARD SCHULTZ, Jr.

REFERENCES CITED

The following references are of record in the file of this patent:

UNITED STATES PATENTS

| Number | Name | Date |
|---|---|---|
| 366,592 | Marsh et al. | July 12, 1887 |
| 855,905 | Rhoods | June 4, 1907 |
| 1,521,340 | Teller | Dec. 30, 1924 |
| 1,592,009 | Simpson | July 13, 1926 |
| 1,611,101 | Day | Dec. 14, 1926 |
| 1,719,568 | Spies | July 2, 1929 |
| 2,117,376 | Strayer | May 17, 1938 |
| 2,182,939 | Brinkman | Dec. 12, 1939 |
| 2,201,051 | Ogilvie | May 14, 1940 |
| 2,266,864 | Hausknecht | Dec. 23, 1941 |